(12) United States Patent
DiLorenzo

(10) Patent No.: US 8,567,047 B1
(45) Date of Patent: Oct. 29, 2013

(54) DEVICE FOR INSTALLING WIRING, ELECTRICAL BOX, AD RECEPTACLE OR SWITCH SIMULTANEOUSLY

(76) Inventor: Frank Anthony DiLorenzo, Beacon, NY (US)

( * ) Notice: Subject to any disclaimer, the term of this patent is extended or adjusted under 35 U.S.C. 154(b) by 0 days.

(21) Appl. No.: 13/400,360

(22) Filed: Feb. 20, 2012

Related U.S. Application Data

(62) Division of application No. 12/431,814, filed on Apr. 29, 2009, now Pat. No. 8,117,746.

(51) Int. Cl.
*B23P 19/00* (2006.01)
*H05K 13/04* (2006.01)

(52) U.S. Cl.
USPC .................. 29/729; 29/270; 29/795; 33/286; 33/528; 33/613

(58) Field of Classification Search
USPC .................. 29/729, 270, 739, 795, 832, 854; 33/228, 286, 290, 528, 613, DIG. 10
See application file for complete search history.

(56) References Cited

U.S. PATENT DOCUMENTS 5,111,593 A * 5/1992 Gehen, Sr. ...................... 33/613
2010/0122466 A1 * 5/2010 Hemingway et al. ........... 33/228

* cited by examiner

*Primary Examiner* — Thiem Phan
(74) *Attorney, Agent, or Firm* — Saile Ackerman LLC; Stephen B. Ackerman

(57) ABSTRACT

A machine for installing electrical box, wiring, and receptacles or switch simultaneously and a process that allows electricians to perform all 3 tasks at one time without the need to return to install receptacles or switch after wallboard is installed comprises: Housing with built-in laser guide and attached magnetic spacers for metal studs or wooden studs that allow for correct alignment of receptacle or switch for applicable wallboard thickness used.

4 Claims, 2 Drawing Sheets

DEVICE FOR INSTALLING WIRING, ELECTRICAL BOX, AD RECEPTACLE OR SWITCH SIMULTANEOUSLY

This is a divisional application of U.S. Ser. No. 12/431,814 filed on Apr. 29, 2009, which is hereby incorporated by reference in its entirety.

BACKGROUND OF THE INVENTION (1) Field of the Invention

This invention relates generally to the field of construction and more specifically to a machine for installing electrical box, wiring, and receptacles or switch simultaneously:

(2) Description of the Related Art

The present invention is a process that allows electricians to perform all 3 tasks at one time without the need to return to install receptacles or switch after wall board is installed. This technology is derived from the inefficiency of having electricians re-visit a job site thus incurring additional labor costs and time scheduling conflicts.

Commercial high rise construction is comprised of tens of thousands of electrical outlets. When considering the labor costs of remobilizing electricians to complete the installation of the receptacles/switches, the adverse effect on project duration results in huge monetary spending while increasing the possibility of delays in meeting scheduling milestones.

Prior technology mandates a three-step process: Install electric box and wiring, install wallboard, install receptacle or switch with proper alignment to existing wallboard. Prior technology incurs huge labor costs when electricians return to install receptacle or switch once wallboard is installed. Eliminating the final step of prior technology contributes to overall project efficiency by reducing time spent on coordinating and scheduling of multiple crafts; in turn, saving time in completing the final project.

SUMMARY OF THE INVENTION

The primary object of the invention is to provide one-time installation of wiring, box, and receptacle or switch.

Another object of the invention is to reduce the labor costs by allowing the electrician to accomplish the entire task at once.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, it discloses a machine for installing electrical box, wiring, and receptacles or switch simultaneously, allowing electricians to perform all 3 tasks at one time without the need to return to install receptacles or switch after wallboard is installed; Comprised of: Body with built-in laser guide and attached magnetic spacers that allow for correct alignment of receptacle or switch for applicable wallboard thickness used; No current technology available that provides one-time installation of wiring, box, and receptacle or switch.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
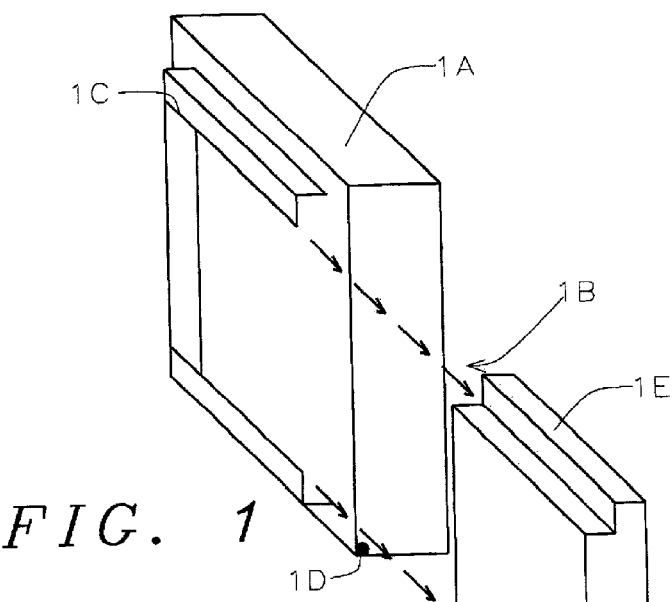
FIG. 1 is an exploded view of the invention. 1(a) is the body of the unit that houses the battery, laser components and 1(b) the on/off switch; 1(c) is the spacer housing permanently attached to the body, accepting and housing various sized magnetic spacers; 1(d) is the actual laser beam projection lens that projects the correct alignment for the switch and receptacle representing the finished location relative to the finished wall thickness; and 1(e) is the appropriately sized magnetic spacer providing the correct alignment for the laser.
Figure 2:
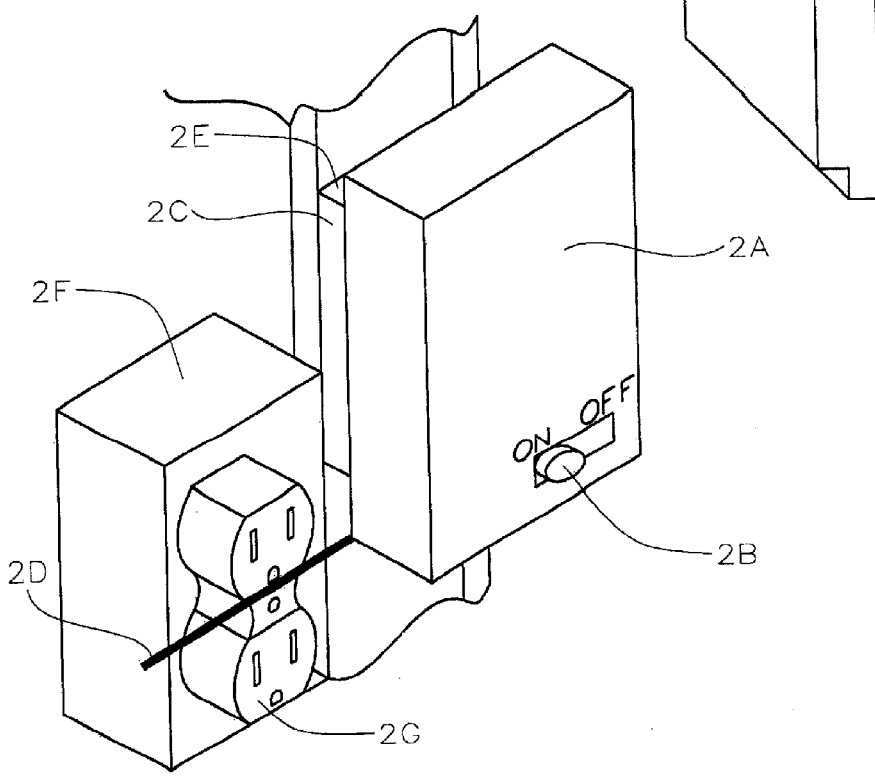
FIG. 2 is a perspective view of the invention. 2(a) is the body of the unit that houses the battery, laser components and 2(b) the on/off switch; 2(c) is the spacer housing, 2(d) the actual laser beam projection lens; 2(e) is the magnetic spacer; 2(f) is the electrical box; and 2(g) is the receptacle.
Figure 3:
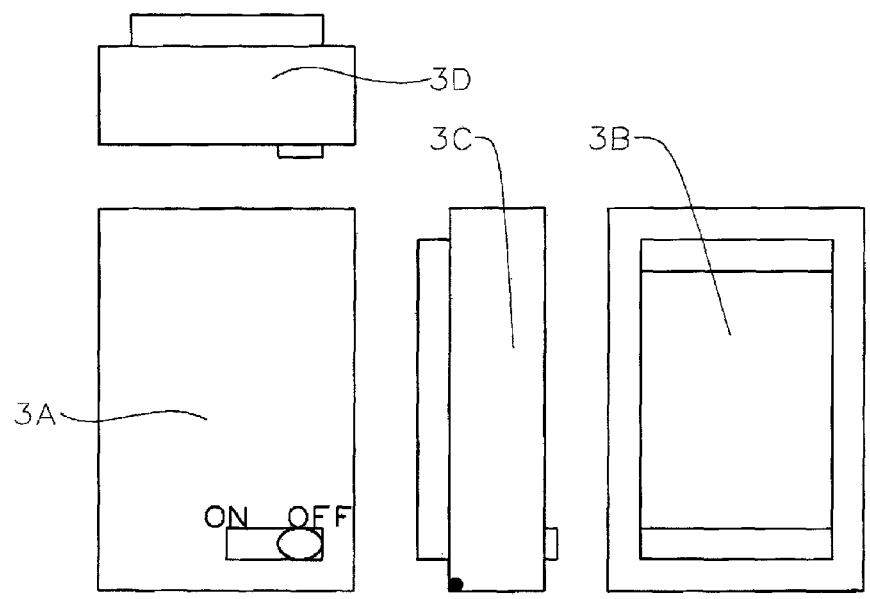
FIG. 3 is a plan view of the invention. 3(a) is the front view of the unit's body; 3(b) is the back view of the unit's body; 3(c) is the side view of the unit's body; 3(d) is the top view of the unit's body.
Figure 4:
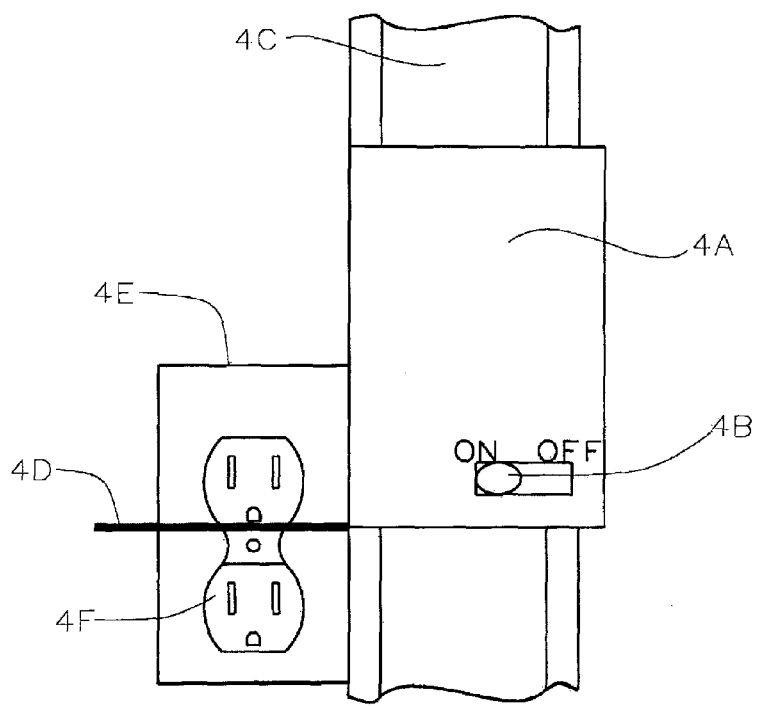
FIG. 4 is an elevational view of the invention. 4(a) is the body of the unit, 4(b) the on/off switch; 4(c) metal or wood stud; 4(d) is the laser beam projection lens; 4(e) is the electrical box; and 4(f) is the receptacle.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with the present invention, current technology allows the electrician to install the wiring and the electrical box only. He then leaves the project and returns when the finished wallboard is installed in order to install and properly align the switch or receptacle to this finished wallboard. This invention allows the electrician to install wiring, box, and receptacle or switch simultaneously thus ensuring precise positioning of receptacle or switch when finished wallboard is installed at a later date.

Operation of this invention requires the user to slide a magnetic spacer into the body that matches with the predetermined thickness of the finished wallboard; then the device is attached to the wall stud where the electrical box, wiring, and receptacle or switch is connected. The device is then turned on projecting a laser beam that will allow the electrician to align the receptacle or switch with the beam. This alignment will precisely match the finished wallboard installed later.

There is no current technology available that provides one-time installation of wiring, box, and receptacle or switch. This invention will reduce construction labor costs and expedite project duration by allowing the electrician to accomplish the entire task at once. This invention is compact in size, lightweight, battery operated, and laser guided.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for installing wiring, an electrical box, and a receptacle or switch simultaneously, comprising:
   a laser guide to align said receptacle or switch relative to the finished wall board thickness; and
   a housing accepting various sizes of magnetic spacers wherein inserting one of said magnetic spacers matching predetermined thicknesses of said wall board to be installed at a later time and wherein projecting a laser beam from said laser guide allows a user to align said electrical box and said receptacle or switch with said wall board installed at said later time.

2. The device according to claim 1 wherein said device further comprises a battery.

3. The device according to claim 1 wherein said device further comprises an on/off switch.

4. The device according to claim 1 further comprising said magnetic spacers.

* * * * *

UNITED STATES PATENT AND TRADEMARK OFFICE
CERTIFICATE OF CORRECTION

PATENT NO. : 8,567,047 B1
APPLICATION NO. : 13/400360
DATED : October 29, 2013
INVENTOR(S) : Frank DiLorenzo Page 1 of 1

It is certified that error appears in the above-identified patent and that said Letters Patent is hereby corrected as shown below:

On the title page item (54) and in the Specification, Col. 1, line 1, delete "Device For Installing Wiring, Electgrical Box, Ad Receptacle Or Switch Simultaneously" and replace with -- Device For Installing Wiring, Electrical Box and Receptacle Or Switch Simultaneously --.

Signed and Sealed this
Seventeenth Day of December, 2013

Margaret A. Focarino
*Commissioner for Patents of the United States Patent and Trademark Office*